United States Patent [19]

Dujari

[11] Patent Number: 4,984,151

[45] Date of Patent: Jan. 8, 1991

[54] FLEXIBLE, NEXT-ADDRESS GENERATION MICROPROGRAM SEQUENCER

[75] Inventor: Vineet Dujari, San Jose, Calif.

[73] Assignee: Advanced Micro Devices, Inc., Sunnyvale, Calif.

[21] Appl. No.: 227,452

[22] Filed: Aug. 2, 1988

Related U.S. Application Data

[63] Continuation of Ser. No. 707,365, Mar. 1, 1985, abandoned.

[51] Int. Cl.$^5$ .............................................. G06F 9/26
[52] U.S. Cl. .................................. 364/200; 364/255.1; 364/261.3
[58] Field of Search ... 364/200 MS File, 900 MS File

[56] References Cited

U.S. PATENT DOCUMENTS

| | | | |
|---|---|---|---|
| 3,634,883 | 1/1972 | Kreidermacher | 364/200 |
| 3,789,365 | 1/1974 | Jen | 364/200 |
| 3,938,096 | 2/1976 | Brown et al. | 364/200 |
| 3,949,370 | 4/1976 | Reyling | 364/200 |
| 3,955,180 | 5/1976 | Hirtle | 364/200 |
| 3,967,104 | 6/1976 | Brantingham | 364/900 |
| 3,991,404 | 11/1976 | Brioschi et al. | 364/200 |
| 4,003,033 | 1/1977 | O'Keefe et al. | 364/200 |
| 4,155,119 | 5/1979 | DeWard | 364/200 |
| 4,179,737 | 12/1979 | Kim | 364/200 |
| 4,200,912 | 4/1980 | Harrington | 364/200 |
| 4,223,381 | 9/1980 | Rozell et al. | 364/200 |
| 4,379,328 | 4/1983 | Catiller et al. | 364/200 |
| 4,383,297 | 5/1983 | Wheatley et al. | 364/200 |
| 4,385,352 | 5/1983 | Bienvenu | 364/200 |
| 4,407,015 | 9/1983 | Ziobro | 364/200 |
| 4,439,828 | 3/1984 | Martin | 364/200 |
| 4,456,970 | 6/1984 | Catiller | 364/900 |
| 4,462,074 | 7/1984 | Linde | 364/200 |
| 4,550,431 | 10/1985 | Werth et al. | 364/200 |
| 4,611,273 | 9/1986 | Pione | 364/200 |
| 4,651,318 | 3/1987 | Luderer | 370/94 |

*Primary Examiner*—David Y. Eng
*Attorney, Agent, or Firm*—Fliesler, Dubb, Meyer & Lovejoy

[57] ABSTRACT

A flexible, sequencer for providing next-address generation in the execution of a microprogram is described. The sequencer includes means for receiving an externally provided base address and an externally provided address offset value, a stack for storing return base address pointers, and means for storing a current program pointer counter address. The sequencer comprises means for selecting an address from one of a plurality of generated addresses and for providing the selected address as the next address in the execution of the microprogram, and means for generating the plurality of addresses including an address generation means selected from the group consisting of means for adding the address offset value with a stack stored return base address, means for adding the address offset value with the current program pointer counter address, means for selectively incrementing the selected address by one of a plurality of predetermined integral values, and means for selectively shifting the address offset value and for overlaying the external base address with the shifted address offset value, each means respectively generating one of the plurality of the generated addresses.

13 Claims, 2 Drawing Sheets

FLEXIBLE, NEXT-ADDRESS GENERATION MICROPROGRAM SEQUENCER

This is a continuation of Ser. No. 707,365 filed Mar. 1, 1985, now abandoned.

FIELD OF THE INVENTION

The present invention generally relates to control-program address sequencer units of computers and, in particular, to a next-address generation microcode sequencer that permits the optimal implementation of rapid execution microprogramming structures.

BACKGROUND OF THE INVENTION

Typical Von Newmann architecture computers operate as sequential state machines. Conventionally, control logic is utilized to implement a desired state machine by defining the state functions and the various conditional inter-state pathways. The control logic may take the form of either random-hardwired or micro-programmed sequence control logic. In the case of random-hardwired control logic, the state machine is implemented directly as an optimized gate logic design. Generally such random-hardwired state machine implementations are recognized for their high speed, optimal use of logic gates, and minimized circuit size and power dissipation characteristics. Such designs are also recognized as each being substantially unique, time intensive to perfect, and correspondingly costly to initially produce.

Microprogrammed implementations of state machines conventionally include a microcode program, or microprogram, a storage unit, a pipeline register and a next-address generator or microprogram sequencer. The control logic often further includes logic components, such as an arithmetic logic unit (ALU), for the performance of specific types of state functions. The microprogram is typically a sequence of microcode words stored in a conventional equivalent of a PROM or ROM memory circuit within the storage unit. The sequencer provides an address to this microcode store as a pointer to the next microcode word in the execution of the microprogram. The microcode store, in turn provides the corresponding microcode word to the pipeline register. In turn, the microcode word is typically buffered by the pipeline register and made available to the various logic components of the state machine control logic. In particular a portion of the microcode word is routed back to the sequencer as a sequencer instruction that generally determines the next address to be generated in the execution of the microprogram. Thus, the state functions of a state machine, as well as the transitions between the various states, can be implemented as a corresponding series of one or more microcode words.

The particular implementation of a microprogrammed control logic state machine is heavily influenced by two considerations. The first is that the microcode word store is, in practical use, limited in size and, therefore, presents a general restriction on the complexity of the state machine. The second consideration is that each microcode word is sequentially executed in a discrete cycle of the control logic. Thus, the speed performance of the state machine implemented is directly dependent on the number of microcode words executed to accomplish each state function and inter-state transition. Consequently, microprogrammed controllers are somewhat slower than their random-hardwired logic counterparts and typically less optimal in terms of both size and power dissipation.

The substantial advantage to utilizing microcoded controllers is that their state machine implementations are relatively quite simple to initially design and subsequently modify. Changes in the microprogram state machine may be necessary to correct for deficiencies in the original state machine design or simply desirable to expand the capabilities of the state machine as a whole. Such changes may be introduced by appropriately modifying the control program provided in the microcode store. Consequently, despite its deficiencies in execution speed, there continues to be substantial interest in and use of microprogrammed controllers.

SUMMARY OF THE INVENTION

It is therefore a purpose of the present invention to provide a microprogram sequencer that significantly enhances microprogram execution speed, particularly in the execution of microprograms implementing complex state machines.

This is attained in the present invention by the use of a sequencer for providing next-address generation in the execution of a microprogram, the sequencer including means for receiving an externally provided base address and an externally provided address offset value, a stack for storing return base address pointers, and means for storing a current program pointer counter address, the sequencer comprising means for selecting an address from one of a plurality of generated addresses and for providing the selected address as the next address in the execution of the microprogram, and means for generating the plurality of addresses including an address generation means selected from the group consisting of means for adding the address offset value with a stack stored return base address, means for adding the address offset value with the current program pointer counter address, means for selectively incrementing the selected address by one of a plurality of predetermined integral values, and means for selectively shifting the address offset value and for overlaying the external base address with the shifted address offset value, each means respectively generating one of the plurality the generated addresses.

Thus, an advantage of the present invention is that it provides an efficient, highly flexible means for implementing microprogram structures including stack relative address branching, condition code dependent repeat, continue and skip branching, nestable loop branching, variable address spacing multi-way branching, and programmable interrupt vectors.

Another advantage of the present invention is that is provides programmable initialization vector branching and programmable condition code generation as a basis for branching.

A further advantage of the present invention is that it may provide for the implementation of any one or combination of the above capabilities so as to admit optional functionality for any particular sequencer application.

Still another advantage of the present invention is that it retains all conventional address branching initialization and interrupt vector response capabilities.

BRIEF DESCRIPTION OF THE DRAWINGS

Other attendant features and advantages of the present invention will become apparent and readily appreciated as the same becomes better understood by reference to the following detailed description when considered in connection with the accompanying drawings, in which like reference numerals designate like parts throughout the Figures, and wherein.

DETAILED DESCRIPTION OF THE INVENTION

Figure 1:
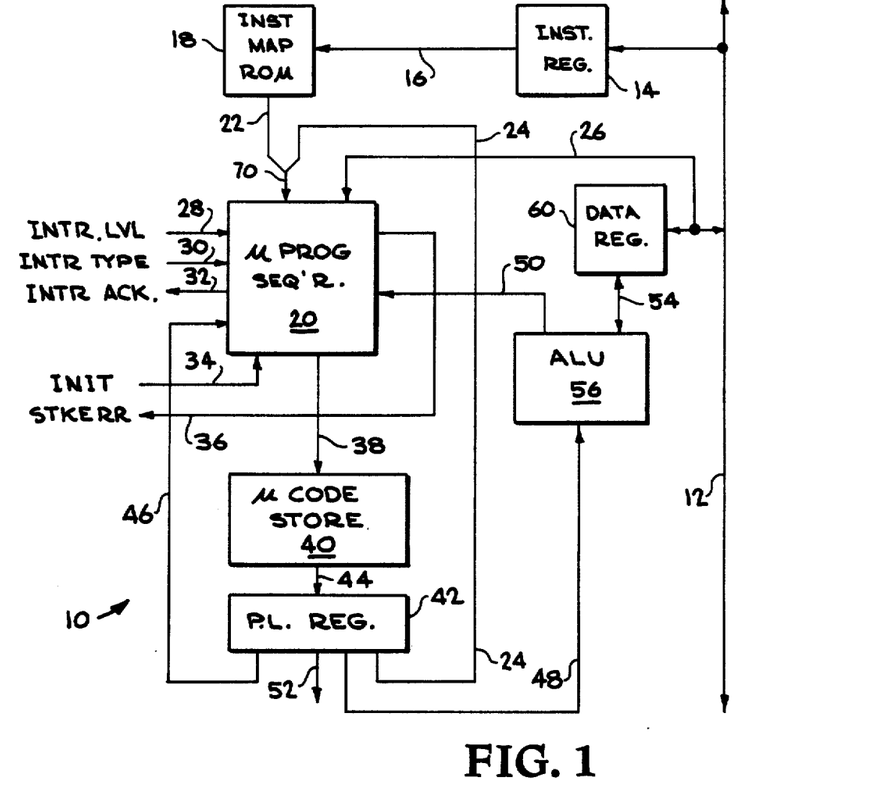
FIG. 1 provides a block diagram illustrating the major logic components of a microprogrammable controller.

A preferred microprogrammed controller, generally indicated by the reference numeral 10, of a computer system is shown in FIG. 1. The controller 10 generally interfaces with all other portions of the computer system via the address, data, and control bus 12. Interfaced to the bus 12 may be such other computer system components as an application program and data storage memory unit and peripheral device interface units, not shown.

The controller 10 itself includes an external instruction register 14 for sequentially receiving and temporarily buffering an application program instruction or a command issued by another controller 10 interfaced to the bus 12. The buffered instruction or command is provided by the instruction register 14 to an instruction map ROM 18 via bus 16. The instruction map ROM 18, though optional, is preferably provided to implement code translation between a command or instruction set preferred for use generally on the bus 12 and the particular instruction set code recognized within the controller 10. This controller instruction set is typically the actual microprogram instruction entry point addresses of the routines directly implementing the corresponding instruction functions. In any case, the map ROM translated instruction or command is transferred to a microprogram sequencer 20 via the bus 22. The microprogram sequencer 20, in accordance with the present invention, further receives data transferred between the controller 10 and the bus 12 via data bus 26, an instruction via sequencer instruction bus 46 and various other control signals such as status flag signals from a controller ALU 56 via status flag bus 50, interrupt level signals via level lines 28, interrupt-type signals via lines 30 and an initialization signal via line 34.

In the performance of its function, the microprogram sequencer 20 notably generates control signals to acknowledge the acceptance of an interrupt request, via line 32, and to indicate the occurrence of an error condition, such as a stack register error, via line 36. Most significantly, however, the microprogram sequencer 20 produces a next-address that is provided over the sequencer address bus 38 to a microcode program store 40. The store 40 preferably includes a PROM or ROM type memory circuit containing the microcoded program implementation of the desired state machine. For purposes of the present invention, it is sufficient to note that the microcoded implementation of the state machine provides sequences of one or more microcode words that correspond to the sequential execution of the state functions and the microprogram branches that provide inter-state transitions necessary for the realization of the state machine. To this end, the store 40 utilizes the next-address provided via the sequencer address bus 38 as a pointer to a corresponding microcode word that is, in turn, provided onto the microcode data bus 44. Typically, a latched buffer, commonly referred to as a pipeline register 42, receives and temporarily stores the microcode word from the data bus 44. The pipeline register 42 functions to make subfields of the binary representation of the microcode word available to various respective subcomponents of the controller 10. In particular, an instruction subfield is provided onto the sequencer instruction bus 46 and returned to the microprogram sequencer 20. Another subfield is preferably provided on the external base-address bus 24 and routed back to the microprogram sequencer 20. The external base-address bus 24 is preferably multiplexed with the map ROM bus 22 to form a single external address input bus 70 to the microprogram sequencer 20. Another subfield of the microcode word stored in the pipeline register 42 is provided via bus 48 as an instruction to another logic subcomponent of the controller 10, such as the ALU 56. Finally other subfields of the microcode word are provided on control lines 52 to control or instruct other aspects of the operation of the controller 10, such as controlling a map ROM bus 22 multiplexer for selection of either an instruction or a base-address for input into the microprogram sequencer 20.

In a conventional manner, the ALU 56 is utilized to perform arithmetic and logical operations of varying degrees of complexity on data. In the controller 10, as shown in FIG. 1, the ALU 56 obtains data from the data portion of the bus 12 via bidirectional data buses 26 and 54, as buffered by a data register 60. In the performance of an instructed function, the ALU 56 periodically provides updated status information, or flag signals, that indicate the current results of its operation. These flag status signals conventionally include signals indicating whether the results of an ALU operation is positive, negative, or zero, whether the result is parity odd or even, and whether a carry out or overflow has occurred. In accordance with a preferred embodiment of the present invention, these status flag signals are provided directly to the microprogram sequencer 20 so as to provide a direct indication of the nature and quality of the data processed by the ALU 56.

The next-address generated by the microprogram sequencer 20 is, in large part, premised on the instruction received via the sequencer instruction bus 46. However, in accordance with the present invention and as will be described in greater detail below, the microprogram sequencer 20 preferably operates to generate the next-address in partial dependence on condition codes produced by logically combining certain of the flag status signals, data received externally from the bus 26, and the external base-address provided on the external address input bus 70. As will be also be described in greater detail below, the microprogram sequencer 20 may generate the next-address provided on the sequencer address bus 38 exclusively depending on the signals provided via the interrupt level and type lines 28, 30 or the initialize line 34. In any case, the microprogram sequencer 20 generates the next-address that, in turn, generally determines the next succeeding next-address. Consequently, the microprogram sequencer 20 provides for the sequential addressing of one or more microcode words and, further, data and condition dependent branching to and return branching from additional series of one or more microcode words. In this manner the controller 10 embodies the fundamental capability of implementing all of the necessary functions of a state machine.

Figure 2:
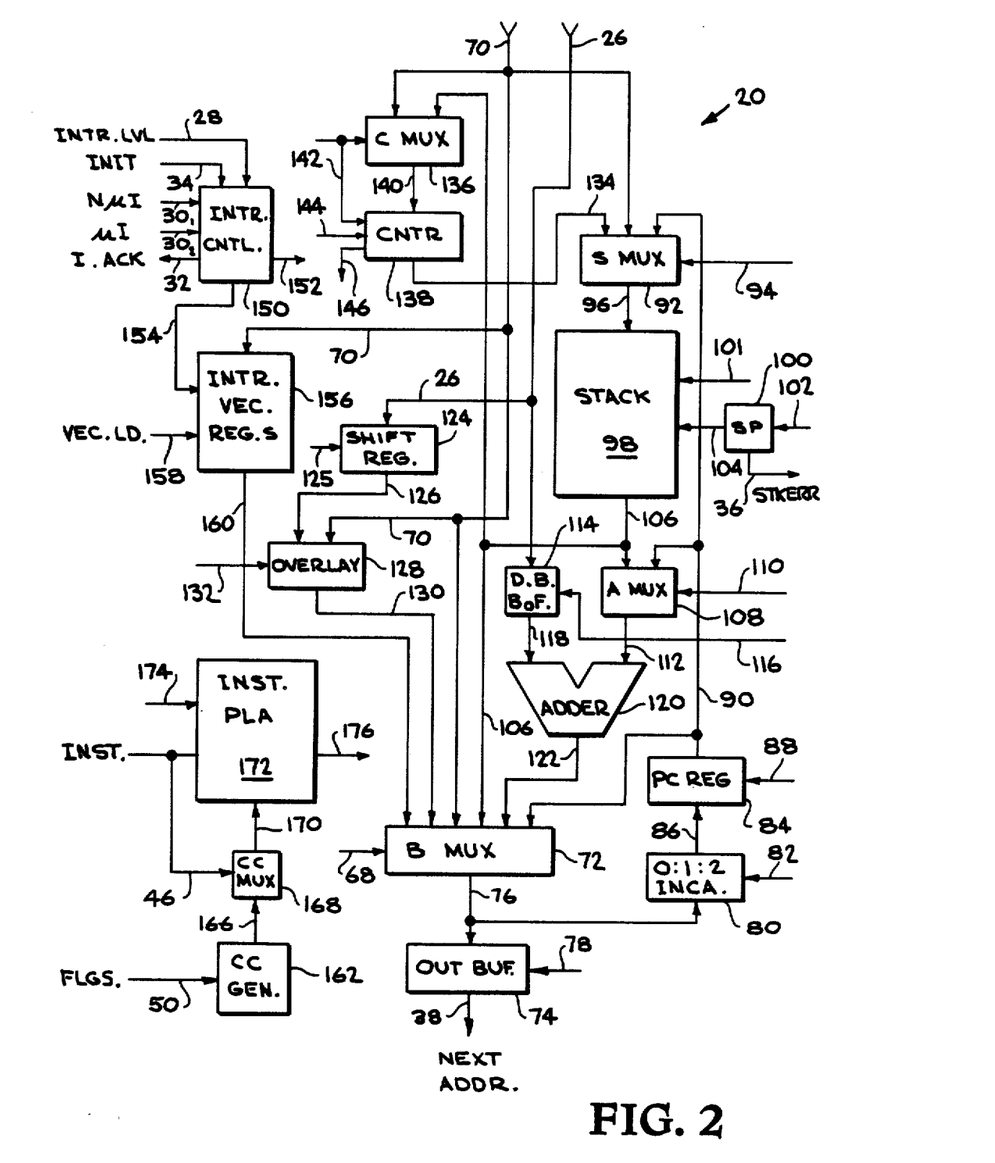
FIG. 2 provides a block diagram of a microcode sequencer architecturally configured in accordance with a preferred embodiment of the present invention.

A program sequencer 20, constructed in accordance with a preferred embodiment of the present invention, is shown in FIG. 2. Central to the operation of the microprogram sequencer 20 is the instruction programmable logic array (PLA) 172, condition code generator 162, and condition code multiplexer 168. Together, these subcomponents receive the next sequencer instruction from the pipeline register 42 on sequencer instruction bus 46 and the status flag signals on the status flag lines 50. In turn, these subcomponents together ultimately produce a variety of subcontrol signals on control lines 176 that operatively configure the internal subcomponents of the entire microprogram sequencer 20 for the performance of the corresponding instruction as conditioned on the status flags and other signals simultaneously received.

In greater detail, the status flag control signals provided on lines 50, as exemplary signals, are logically combined by the condition code generator 162 to provide a number of condition codes on the condition code bus 166. These condition codes are preferably fewer in number than the number of status flag control signals received and, further, preferably represent the optimal group of combined conditions necessary for consideration with the instruction so as to appropriately specify all of the subcomponent control signals. These condition codes preferably represent such relatively complex conditions as greater-than-or-equal, less-than-or-equal, positive non-zero, negative non-zero, greater-than, less-than, equality, and true zero. Naturally, still other condition codes might be produced by the condition code generator 162. However, in accordance with the present invention, the condition code generator 162 provides a limited set of condition codes, as may be optimal for use by the microprogram sequencer 20, without loss of general flexibility by providing for the implementation of the condition code generator 162 as a programmable logic array. By utilizing a programmable logic array circuit in the generation of the condition codes, the present invention optimally generates only the select few condition codes required to supplement the instructions provided to the instruction PLA 172. Thus, the present invention alleviates the need to provide for the generation of a wide variety of generalized condition codes. This significantly reduces the circuitry required to implement the condition code generator 162. Similarly, the condition code multiplexer 168 need only select from the limited set of condition codes and, accordingly, its construction is correspondingly simplified.

Perhaps most significantly, however, is that a lesser portion of the instruction subfield may be required to specify the particular condition code selected by the condition code multiplexer 168. This, in turn, reduces the required number of bits in the sequencer instruction subfield, and the overall bit width of both the pipeline register 42 and the microcode store 40. Even where the reduction in instruction subfield width is a single bit, the corresponding reduction in circuitry required to implement the microcode store 40 can be substantial since it is directly proportional to the microcode word capacity of the store 40.

Finally, the sequencer instruction and the selected condition code, as provided on line 170 from the condition code multiplexer 168, are logically combined by the instruction PLA 172 to provide the various subcomponent control signals required to operatively implement the instruction. The subcomponent control signals are generally indicated as being provided via control bus 176.

In order to accommodate the recognition and appropriate execution of a diversity of sequencer instructions, the microprogram sequencer 20, in accordance with the present invention, provides for the generation of a next-address in a variety of manners and methods. For each, the subcomponents of the microprogram sequencer 20 operatively act alone or in concert to generate a potential next-address. In a preferred embodiment of the present invention, as shown in FIG. 2, a B multiplixer 72 is utilized to collect each of the potential next-addresses as provided via buses 90, 122, 106, 70, 130 and 132. In accordance with the subcomponent control signals provided on multiplexer input select lines 68, the B multiplexer 72 enables the transfer of a potential next-address to its selected next-address output bus 76. In turn, the selected next-address is latched into the output buffer 74 in response to a latch enable signal on subcomponent control line 78. The selected next-address is thus made available on the sequencer next-address bus 38.

In accordance with a preferred embodiment of the present invention, one manner of providing a potential next-address to B multiplexer 72 is realized by the provision of the variable incrementer 80 and pointer counter register 84 subcomponents. The variable increments 80 is provided so as to receive the selected next-address from the B multiplexer 72 via bus 76. As determined by the subcomponent control signals provided on increment select lines 82, the incrementer 80 variably increments the selected address and provides the resultant address on its output bus 86. The PC register 84, in turn, latches in the incremented address in response to a subcomponent control signal provided on latch control line 88. Thus, a potential next-address is provided to the B multiplexer 72 via the PC register output bus 90.

Preferably, the incrementer 80 is functionally selectable to increment the selected next-address by the integral values of 0, 1 or 2. While incrementer values larger than 2, as well as negative values, could be used, the choice of the above preferred values are considered optimal in terms of microprogram functionality and optimal use of circuitry.

The functionality obtained through the use of the variable incrementer 80 is that it efficiently implements the microprogram branch capabilities of conditional, single microcode word skip, repeat and continue. The conditional skip capability permits a single microcode word to specify that if a certain condition 60 then currently exists, such that a specific condition code is presented to the instruction PLA 172, then the variable incrementer 80 will increment the selected next-address by a value of 2 in generating its corresponding potential next-address. Where the selected next-address has been incremented by 2 and the conditional branch is taken, the microcode word residing at the intervening address is effectively skipped.

Without the conditional skip capability of the present invention, the intervening microcode word would generally be executed. In order to effectively skip the intervening microcode word, the instruction PLA 172 would need to logically combine the instruction provided thereby with the prevailing condition code to produce subcomponent control signals that simply select the next succeeding address as the address to be provided on the next-address bus 38. Alternately, several microcode words would need to be executed to establish the current condition code and perform a conditional branch. In either case, one or more microprogram sequencer execution cycles are wasted relative to the present invention in performing the same microprogram address branch.

Similarly, the conditional, single microcode word repeat capability accomplishes a microprogram branch that would require one or more additional sequencer cycles in the absence of the present invention. The conditional repeat capability is implemented in the present invention by the performance of a 0 increment by the variable incrementer 80. Thus, the selected next-address and, therefore, the same microprogram sequencer instruction are repeatedly executed until the condition code specified by the instruction changes. The instruction combined with the new condition code provides for a corresponding change in either the increment value selected for the variable incrementer 80 or the potential next-address selected by the B multiplexer 72.

Conventionally, at least two microcode words would be required to implement the evaluation of a then current condition code and to provide a conditional branch back to the previous address corresponding to the condition code checking microcode word. Thus, the present invention again reduces the number of sequencer cycles to perform a corresponding function as well the number of microcode words necessary for its each implementation.

Lastly, the selection of an increment-by-one value for the variable incrementer 80 provides the conventional capability of sequentially generating addresses for the execution of microcode words. Thus, the increment-by-one capability provides a continue function in support of the conditional skip and repeat capabilities of the variable incrementer 80. That is, instructions consistent with the present invention preferably call for skip-or-continue and repeat-then-continue address branching.

Another potential next-address is ultimately provided by the adder 120. In accordance with a preferred embodiment of the present invention, the adder 120 receives an internally sourced base address from the A multiplexer 108 on the A multiplexer output bus 112 and an externally provided address offset value from bus 118, as buffered by the data bus buffer 114 and received from the external data bus 26. Referring briefly again to FIG. 1, the address offset value provided on the data bus 26 may be the result of an operation performed by a logic component of the controller 10, such as the ALU 56. In this manner a data-dependent address offset value may be generated and, when added with the internal base address provided from the A multiplexer 108, provides a branch address relative to the internal base address. That is, a sequence of microcode words may call for the operation of the ALU 56 on data that varies depending on the current circumstances to which the controller 10 is exposed. The resultant data produced by the ALU 56 can be used as an address offset value that, when added with the internal base address, provides a potential next-address that appropriately points to the beginning of a sequence of microcode words appropriate for execution in view of the current data circumstances.

Accordingly, the present invention provides for the latching of an address offset value in the data bus buffer 114 in response to a subcomponent control signal on line 116. The present invention also provides for the output of the stack register 98 to be provided as an input to the A multiplexer 108 via stack output bus 106. A second input to the A multiplexer 108 is provided from the PC register 84 via PC output bus 90. Selection between the two input buses of the A multiplexer 108 is controlled by the subcomponent control signals provided on the A multiplexer select lines 110. As is generally well known, a stack register array, such as stack register array 98, is designed to function as a last-in, first-out (LIFO) register array. Typically, the storage and retrieval of data is coordinated by a stack pointer register 100 that maintains a pointer value associated with the last stack register written to and next stack register to be read from. The stack 98 and stack pointer 100 are generally controlled by read, write and pointer increment and decrement subcomponent control signals provided via lines 101, 102. Data to be written to the stack register 98 is collected by an S multiplexer 92 from a variety of sources including the external base address bus 70 and the PC output bus 92. An S multiplexer selected address is provided to the stack register array 98 via the stack input bus 96. The selection of an input address by the S multiplexer 92 is controlled by the subcomponent control signals as provided to the S multiplexer 92 via the select lines 94. This collection of subcomponents permit the writing, or pushing, of the current PC register 84 buffered address into the stack register array 98 and the simultaneous branching to a relatively separate section of the microprogram. This is commonly appreciated to be the implementation of a subroutine call function. A microprogram return microcode word subsequently executes to read, or pop, a stack buffered address from the stack register array 98 onto its stack output bus 106. Conventionally, both push and pop operations are followed by an increment and decrement respectively of the pointer value stored by the pointer register 100. Thus, by requiring a properly balanced number of push and pop operations within a subroutine, the corresponding previous contents of the PC register 84 will be provided as the potential next-address on bus 106 upon returning from the subroutine. Selection of this potential next-address by the B multiplexer 72 thereby results in the resumption of the microprogram at an address immediately subsequent to that corresponding to the microcode word responsible for the call function.

In accordance with a preferred embodiment of the present invention, the stack output bus 106 further provides the popped address, as passed by the A multiplexer 108, to be added by the adder 120 with the externally provided address offset value as then present in the data bus buffer 114. The resulting stack return relative address, as a potential next-address, is provided on adder output bus 122 to the B multiplexer 72. Consequently, the present invention implements relative address branching in combination with the execution of a return function microcode word. That is, a data dependent relative address branch is performed simultaneous with the performance of a return from the execution of a relatively separate sequence of microcode words. Without the benefit of the present invention, a similar data dependent branching requires the execution of several additional microcode words following the execution of the return function microcode word.

Another potential next-address is generated by the operation of a shift register 124 and overlay register 128. The shift register 124 preferably receives the address offset value, as provided on the external data bus 26, as its only data input. The shift register 124 preferably functions to shift the address offset value by a number of bit positions as specifically selected in response to subcomponent control signals provided on the shift select lines 125. The resulting shifted address offset value is provided to the overlay register 128 via the interconnecting bus 126. The overlay register 128 further receives the external base address, via the external input line 70, as an input. The overlay register 128 preferably functions to overlay, by corresponding bit position replacement, the external base address with a portion of the shifted address offset value. Selection of the specific overlay portion of the shifted address offset value is controlled by subcomponent control signals provided on the overlay width select lines 132. The specified overlay width is preferably relative to the shifted bit corresponding to the modified least significant bit of the address offset value and extends toward the most significant bit of the shifted address offset value. The potential next-address formed as a result of the overlay is naturally directly dependent on the address offset value. This potential next-address is also dependent on the number of bit shifts performed by the shift register 124. The number of possible potential next-addresses that can be formed is, however, solely dependent on the number of bits taken from the address offset value and overlayed in the overlay register 128 onto the external base address. This allows a multi-way branch into an address table with $2^x$ entry addresses spaced every $2^y$ addresses, where x is the number of bits in the address offset overlay and y is the number of bit positions that the overlay was effectively shifted. For example, an x overlay bit width of 3 and a y bit shift value of 4 results in a branch address table having 8 entry addresses including the external base address and having an entry point address uniformly spaced every 16 addresses thereabout. Thus, an external base address of 280 Hex and an address offset value of 35 Hex yields 2D0 Hex as the corresponding multiway branch entry point address. This derivation is illustrated in greater detail in Table I below.

TABLE I

|  | Hexadecimal | Binary |
| --- | --- | --- |
| External Base Address | 280 | 0010 1000 0000 |
| Address Offset Value | 35 | 0000 0011 0101 |
| Shifted Address Offset Value (with zero fill) | — | 0011 0101 0000 |
| Overlay External Base Address | 2D0 | 0010 1101 0000 |

Since the address offset value initially received by the shift register 124 is taken from the external data bus 26, the specific branch address formed in the execution of the multiway branch is naturally data dependent.

A particular advantage of the multiway branch capability of the present invention is that space is provided within the table for the respective sequences of one or more microcode words that are appropriate for immediate execution upon a branch to their corresponding entry point addresses. Further, the number of table addresses allotted for each sequence and the number of table entry points are both directly specified by the particular multiway branch instruction executed and, therefore, permit a great degree of flexibility in establishing a multiway branch that most closely matches the needs of any particular state machine in implementing the microprogram.

Conventionally, multiway branch tables are allocated with only a single address for each address entry point. The microcode word corresponding to an entry point address must, therefore, provide a further branch to the lead address corresponding to the sequence of microcode words appropriate for the specific multiway branch originally taken. While the present invention possesses sufficient flexibility to implement a single address per entry point multiway branch table, the present invention is not restricted to the use of such tables and does not incur the effectively wasted execution cycle time in further branching to the respective corresponding sequences of microcode words.

Another source of potential next-addresses is the interrupt vector register array 156. As is generally well known, an interrupting event may occur at any time during the operation of a controller, such as controller 10 of FIG. 1, and characteristically requires immediate servicing. In accordance with a preferred embodiment of the present invention, controller 10 is notified of the interrupting event by the provision of an interrupt signal on a corresponding one of the interrupt level lines 28. These lines 28 are logically graded to permit prioritization of the interrupting events. In addition to or in place of an interrupt signal on the lines 28, an interrupting event also provides an interrupt-type signal on lines 30. The interrupt-type signals establish whether the interrupting event is subject to prioritization or maskable. In any case, an interrupt acknowledge signal is provided by the controller 10 as an acceptance of the obligation to service a particular interrupt.

Referring again to FIG. 2, the interrupt vector register array 156 and an interrupt controller 150 are provided to source an appropriate potential next-address, commonly referred to as an interrupt vector address, via bus 160 to the B multiplexer 72. While the interrupt controller 150 is shown separate from the instruction PLA 172, for purposes of clarity of discussion, it preferably constitutes a part thereof.

In particular, the interrupt controller 150 receives respective interrupting event signals on the interrupt level lines 28 and their interrupt-type signals on the nonmaskable interrupt line $30_1$ and the maskable interrupt line $30_2$. The interrupt acknowledge signal is provided by the interrupt controller 150 on line 32. In addition, an initialization request signal, treated as a special form of interrupting event signal, is received on the initialization line 34. As will be seen, the only relevant distinction between an initialization event and any other interrupting events is that there is no particular need to provided an interrupt acknowledge signal on line 32 or save any current microprogram related status information, since the initialization request overrides all other activities of the controller 10 and, in particular, effectively resets all aspects of the microprogram sequencer 20. However, for all interrupting events acknowledged for servicing, as well as the initialization interrupting event, the interrupt controller 150 functions to logically combine the various interrupt related signals provided thereto and provides a preferably binary coded interrupt vector register address, via interrupt address bus 154, to the interrupt vector register array 156. As will be described in greater detail below, each vector register of the array 156 stores a vector address corresponding to each interrupting event that may be recognized by the interrupt controller 150. Thus, the vector address of the register specified by the interrupt address provided on bus 154 is transferred as a potential next-address to the B multiplexer 72. Simultaneously, the interrupt controller 150 provides a control signal on line 152 as one of the additional inputs 174 to the instruction PLA 172. In response, the instruction PLA 172 provides the necessary subcomponent control signals on lines 176 to push the current contents of the PC register 84 onto the stack 98, thereby effectively storing the current execution point in the microprogram, and selecting the vector address present on bus 160 for transfer by the B multiplexer 72 as the next-address to be provided on the next-address bus 38. Preferably, the interrupt vector address so provided appropriately points to a sequence of one or more microcode words that, when executed, provide for the servicing of the interrupting event.

In accordance with a preferred embodiment of the present invention, the interrupt vector register array 156 is a programmable memory unit. The interrupt vector registers are preferably loaded with their interrupt event corresponding vector addresses by sequentially transferring addresses from the external input bus 70 to the respective registers of the array 156. Selection of the vector register to be loaded is accomplished by effectively simulating the occurrence of a serviceable interrupting event so as to cause the generation of the vector register's corresponding binary coded interrupt address. A vector load subcomponent control signal is provided on line 158 to the interrupt vector array 156 to distinguish between the occurrence of a true interrupting event and trigger the loading of a new interrupt vector address. In this manner, all of the interrupt vector addresses may be sequentially loaded into the interrupt vector register array 156 and subsequently modified during the course of and in accordance with the execution of the microprogram. Preferably, however, the initialization vector address is provided but once to its corresponding vector register array. This is accomplished through the use of otherwise conventional PROM or mask-programmable ROM memory cells in the construction of the initialization vector address register of the array 156. As such, the initialization register may be realized as located relatively separate from the RAM interrupt vector address registers of the remainder of the array 156. Alternately, the entire interrupt vector register array may be constructed as a PROM or ROM array generally allowing only a single opportunity to establish the respective vector addresses.

An advantage of the preferred embodiment of the present invention is that changes in the microprogram resulting indirectly in changes of the address locations of the interrupt servicing routines therein will not have any impact on the operation of the microprogram sequencer 20. The vector addresses are preferably loaded from the microprogram store 40 and into the interrupt vector register array 156 as part of the self-initialization routine of the microprogram. In the absence of the present invention, where interrupt vector addresses are predetermined and stored permanently in the microprogram sequencer 20, a branch table at the predetermined vector addresses is required to redirect the individual interrupt branches to their appropriately corresponding interrupt service routines. Though functionally similar to the present invention, the use of the address branch table requires the controller 10 to effectively waste at least one additional execution cycle to reach an appropriate interrupt service routine and begin execution to service the interrupting event. Significantly, the present invention expends execution cycle time only at initialization to load the interrupt vector addresses (self-initialization). Conversely, the use of an interrupt branch table wastes execution cycle time each and every time an interrupting event is serviced.

Alternately, a conventional external controller component may be utilized to provide the interrupt vector addresses and, thereby, permit the vector interrupt addresses to be changed to reflect changes in the microprogram interrupt service routine addresses. This, however, requires significant additional circuitry to multiplex the next-address provided by the microprogram sequencer 20 with the interrupt vector address as provided by the additional external component, as well as to coordinate the operation of the external component with that of the microprogram sequencer 20 under all operating circumstances.

In accordance with the present invention, another source of a potential next-address is a counter 138 and its associated C multiplexer 136 operating in combination with the S multiplexer 92, stack register array 98 and stack pointer 100. The C multiplexer 136 receives, as its inputs, the external base address as provided on the external base address input bus 70 and a counter value received from the stack register array 98 via the stack output bus 106. Selection of one of the two inputs to the C multiplexer 136 is specified by subcomponent control signals provided on the C multiplexer select lines 142. The output of the C multiplexer is coupled to the input of the counter 138 via the transfer bus 140.

The counter 138 receives the subcomponent control signals provided on lines 142 as well as counter specific subcomponent control signals on lines 144. In particular, the control signals provided on C multiplexer select lines 142 preferably specify that an external base address is to be multiplexed through the C multiplexer 136 and loaded into the counter 138.

In accordance with a preferred embodiment of a present invention, the external base address is effectively utilized as a count value specifying the number of iterations of a microprogram loop that are to be performed. Preferably, the counter 138 operates as a decrementer in response to a decrement count control signal provided on the counter specific control lines 144. Further, the counter 138 preferably provides a zero decremented count value detect signal, via control line 146, to the instruction PLA 172 as one of the control input lines 174 thereto. While any counter mode, such as increment, and any count value for comparison with the count value to produce the detect signal on line 146 could be specified, the decrement function and zero detect count value are preferred as permitting the iteration value to be directly specified in the microprogram and as optimally providing the desired, preferred microprogram functionality. In any case, the count value produced by the counter 138 may be stored in the stack register array 98 by its provision via the counter output bus 134 as an additional, selectable input to the S multiplexer 92.

A microprogram loop for a predetermined number of loop iterations is preferably set up by the execution of a 'begin loop' instruction microcode word. Execution of this microcode word provides the predetermined iteration count value, effectively as an external base address via external address bus 70 and by selection through the C multiplexer 136 to the counter 138. Functionally in parallel, the begin loop instruction further causes the selected next-address to be incremented by 1 by the incrementer 80, latched into the PC register 84 and passed immediately onto the PC output bus by the PC register 84. Execution continues with the sequential pushing of the PC register 84 potential next-address followed by the counted 84 count value into respective next available stack registers of the stack register array 98. Finally, execution completes with the potential next address provided by the PC register 84 being selected by way of the B multiplexer 72 as the next address for execution in the microprogram.

Any number of microcode words may then be executed until a microcode word corresponding to an 'end loop' instruction microcode word is encountered. Execution of the end loop microcode word causes the stack register array stored loop count value, as properly present in the next register to be read, to be popped from the stack register array 98 and loaded via the stack output bus 106 and C multiplexer 136 into the counter 138. The count value is decremented in the counter 138 while the PC microprogram address is simply read, preferably just read out without adjusting the stack pointer as when popping a register stored address from the stack register array 98, and provided on the stack output bus 106 to the B multiplexer 72 as a potential next-address. Where the decrementing of the count value has not caused the issuance of a zero detect signal on line 146, the decremented count value is pushed back on into the next available register of the stack register array 98. Functionally in parallel, the B multiplexer 72 is controlled so as to select the potential next-address provided on the stack output bus 106 as the next-address for execution. Thus, microprogram execution continues anew at the beginning of the loop sequence of microcode words.

Where the count value is decremented to zero in the execution of an 'end of loop' instruction microcode word, the zero detect signal is correspondingly provided on line 146 to the instruction PLA 172. Accordingly, subcomponent control signals are issued to the B multiplexer 72 so as to select, preferably, the incremented by one potential next-address as provided on bus 90 from the PC register 84. In addition, the stack pointer 100 is directed by an appropriate control signal on its subcomponent control lines 102 so as to effectively complete the popping of the PC address corresponding to the beginning of the microprogram loop. This is done to clear the stack register array 98 of all information relating to the just completed microprogram loop. Consequently, execution of the microprogram continues preferably at the next sequential microprogram address following the 'end of loop' instruction microprogram word.

A particular advantage of the above-described microprogram loop capability provided by a preferred embodiment of the present invention is that perfect nesting of loops is made possible. Since both the microprogram address corresponding to the beginning of a particular loop as well as the current loop iteration count value are stored together in the stack register array 98, a loop lying perfectly or fully within an outer loop will execute without impacting on the execution of successive outer loops so long as stack push and pop operations remain balanced and to the extent that the stack register array 98 can appropriately store their respective sets of loop beginning microprogram addresses and iteration count values. The limitation to perfect nesting of the microprogram loops is required to insure that the various count values and loop beginning addresses, as well as all other information stored in the stack register array 98, retain their expected correspondence with the nested loops of the microprogram.

A final source of a potential next address is the external input data bus 70. In accordance with the preferred embodiment of the present invention, the provision of an external base address provided either from the pipeline register 42 or the instruction map ROM 18 is routed by the external input data bus 70 directly to the B multiplexer 72. This allows branching to an absolute address within the microcode store 40 corresponding to the beginning of the microcode sequence for performing an instruction specified function or, simply, to permit an absolute or conditional direct branch to a different microcode address at any time in the performance of the microprogram.

Figure 3:
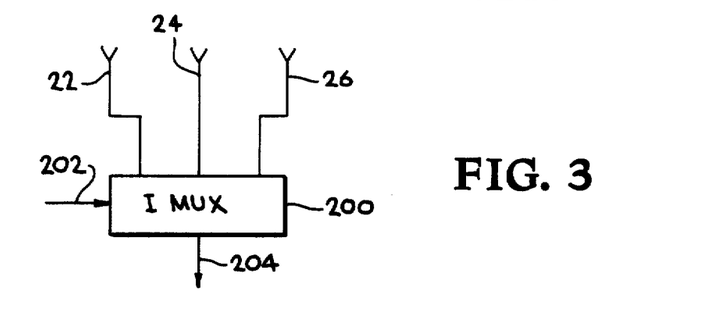
FIG. 3 provides a simple block diagram illustrating a preferred modification of the block diagram of FIG. 2.

A modification of the microprogram sequencer 20 illustrated in FIG. 2 is detailed in FIG. 3. As an alternate preferred embodiment of the present invention, an I multiplexer 200 is preferably utilized to receive the next instruction address from the instruction map ROM 18 via the instruction address bus 22, the external base address as provided on the external base address bus 24, and the externally provided data from the external data bus 26 as its three inputs. Preferably, the I multiplexer 200 includes a data latch and is controlled, both for the selection of an input source and the latching of the data or base address so received, by subcomponent control signals received on the I multiplexer control lines 202. The single output bus 204 of the I multiplexer 200 effectively replaces the external input bus 70 and address offset value bus 26 within the microprogram sequencer 20 of FIG. 2. The I multiplexer output bus 204 preferably connects directly to the B multiplexer 72, C multiplexer 136, shift register 124, interrupt vector register array 156, the overlay register 128 and the S multiplexer 92. In addition, the I multiplexer output bus 204 connects directly to the adder 120 directly, since the need for the data bus buffer 114 is obviated in view of the inclusion of a data latch within the I multiplexer 200. The use of the I multiplexer 200 thereby simplifies the internal architecture of the microprogram controller 20 to some significant degree. Further, the possible routing of externally provided data to the C multiplexer 136 permits the iteration count value of a microprogram loop, as obtained upon entry into the loop, to be data dependent.

Provision of the I multiplexer 200 physically in the path of each instruction external base address and data bus transfer, however, reduces the timing tolerances that are acceptable in the operation of the microprogram sequencer 20. Additionally, the data dependent iteration count capability can be effectively obtained without resort to the multiplexer 200 by providing the external data bus 26 as an additional input to the C multiplexer 136. Consequently, the use of the I multiplexer 200 is preferred only as an alternate to the previously described preferred embodiments of the present invention.

Thus, a highly flexible, next-address generation microprogram sequencer that provides for the optimal implementation sequencer subcomponents that, in turn, optimally permit the use of microprogramming structures including stack relative branching, single microcode word skip or continue and repeat-then-continue conditional branching, variable entry point number and entry address spacing multiway branching, programmable interrupt and initialization vector addressing and nested microprogram loop branching has been described. Also described is a programmable condition code generator for producing the optimal subset of condition codes necessary for consideration in combination with the microprogram sequencer execution instructions.

In view of the foregoing disclosure, a person of skill in the art will appreciate that many modifications and variations in the architecture and construction of the present invention are clearly possible and contemplated. It is therefore to be understood that, within the scope of the appended claims, the present invention may be practiced otherwise than as specifically described above.

I claim:

1. A sequencer for generating a next-address in the execution of a micro-program, said sequencer comprising:
   (a) means for final selection of an address from a plurality of potential next-addresses and for providing the finally selected next-address as the next-address in the execution of said micro-program;
   (b) stack register array means for storing a plurality of micro-program values, including micro-program addresses, in a last-in/first-out stack register array manner;
   (c) means for providing a micro-program address offset value; and
   (d) means for adding said micro-program address offset value and the last-in one of the micro-program values stored in said last-in/first-out stack register array to generate a micro-program address relative to a value stored in said last-in/first-out stack register array as one of said plurality of potential next-addresses provided to said final selection means.

2. The sequencer of claim 1 further comprising:
   (a) means for variably incrementing the finally selected next-address provided by said final selection means;
   (b) an address storage register for storing the incremented address generated by said variably incrementing means; and
   (c) adder input means for selecting an adding means input address from either said address storage register or said last-in/first-out stack register array and providing said adding means input address to said adding means.

3. The sequencer of claim 2 further comprising;
   (a) loop iteration means for storing a loop iteration value and for modifying said loop iteration value; and
   (b) loop control means for transferring said loop iteration value and a loop instruction address as stored by said address storage register from said loop iteration means and said address storage register, respectively, to said last-in/first-out stack register array and from said last-in/first-out stack register array respectively to said loop iteration means and said final selection means.

4. A sequencer for generating a next-address in the execution of a micro-program, said sequencer comprising:
   (a) means for selecting an address from one of a plurality of generated, potential next-addresses and for providing said selected next-address as the next address in the execution of said micro-program;
   (b) means for receiving a base address;
   (c) means for receiving an address offset value;
   (d) means for selecting a bit-field portion of said base address and a bit-field portion of said address offset value, said bit-field portions being of corresponding bit-width, and for overlaying by bit position replacement said bit-field portion of said base address with said bit-field portion of said address offset value, said bit-field selecting means providing the resultant base address as one of said potential next-addresses.

5. The sequencer of claim 4 wherein said address offset value receiving includes means for bit shifting said address offset value and for providing the shifted address offset value to said bit-field selecting means as said address offset value.

6. The sequencer of claim 5 wherein said bit shifting means bit-shifts said address offset value so that said bit-field selecting means overlays the least significant bit portion of said bit-field portion of said base address with the least significant bit portion of said address offset value.

7. A sequencer for generating a next-address in the execution of a micro-program, said sequencer comprising:
   (a) selector means for selecting one of a plurality of potential next-addresses as the next-address in the execution of the micro-program;
   (b) programmable means for storing a plurality of program vector addresses; and
   (c) means for responding to an externally provided signal by providing a particular one of said program vector addresses as a potential next-address to said selector means, wherein said programmable means is reprogrammable and wherein said responding means is responsive to an initialization request, said responding means including means for providing a predetermined initialization program vector address as the potential next-address provided to said selector means by said responding means, said sequencer further comprising means, responsive to said initialization program vector address for programming said programmable means with a plurality of program vector addresses.

8. A versatile microprogram next-address sequencer for providing successive microprogram addresses in the execution of a microprogram, said sequencer comprising;
   (a) control means for generating a plurality of sequencer control signals for directing the internal operation of said sequencer in response to a predetermined sequencer instruction;
   (b) stack storage means for storing microprogram addresses and data values, said microprogram addresses including loop return and loop begin addresses;
   (c) multiplexer means, responsive to said control means, for selecting a next-address from a plurality of potential next-addresses;
   (d) incrementer means, responsive to said control means, for variably incrementing said next-address by one of a predetermined set of integral values and for providing the incremented next-address to said multiplexer means as one of said potential next-addresses, said incrementer means including first storage means for storing the incremented next-address;
   (e) second storage means, responsive to said control means, for receiving an address offset value;

(f) input selector means, responsive to said control means, for selecting to receive a microprogram address from a plurality of address sources including said stack means and said first storage means;

(g) means, responsive to said control means, for adding a microprogram address selected by said input selector means with the address offset value stored by said second storage means and for providing the sum thereof as a potential next-address to said multiplexer means;

(h) shift register means, responsive to said control means, for receiving the address offset value stored by said second storage means and for shifting the address offset value a predetermined number of bit positions; and (i) overlay means, responsive to said control means, for receiving a base microprogram address and the shifted address offset value from said shift register means, said overlay means including means for replacing a bit-field portion of the base microprogram address with a corresponding bit-field portion of the shifted address offset value, said replacing means providing the resultant bit-field portion replaced base microprogram address to said multiplexer means as a potential next-address.

9. The sequencer of claim 8 further comprising;

(a) counter means, responsive to said control means, for receiving and decrementing a loop count value and for transferring the decremented loop count value to said stack means; and (b) counter multiplexer means, responsive to said control means, for providing the current loop value to said counter means, said counter multiplexer means having a first input for receiving a predetermined loop count value and a second input coupled to said stack means for receiving a last decremented loop count value.

10. The sequencer of claim 9 wherein said sequencer receives a plurality of interrupt request signals and an initialization signal, said sequencer further comprising:

(a) reprogrammable means for storing a plurality of microprogram vector addresses for respective selection in response to receipt of any of said plurality of interrupt request signals;

(b) means for storing an initialization microprogram vector address for selection in response to receipt of the initialization signal;

(c) means for transferring one of said microprogram vector addresses or said initialization vector address to said multiplexer in response to the receipt of a corresponding one of said interrupt request signals or said initialization signal; and (d) means, responsive to said control means, for enabling the storage of a plurality of microprogram addresses in said reprogrammable means.

11. The sequencer of claim 10 wherein said control means receives a plurality of condition status signals and wherein said control means includes first programmable means for logically combining said condition status signals to select a condition code from a predetermined set of condition codes and second programmable means for logically combining said selected condition code with said sequencer instruction to select and provide a plurality of subcomponent control signals.

12. A sequencer for generating a next-address in the execution of a micro-program, said sequencer comprising:

(a) means for final selection of an address from a plurality of potential next-addresses and for providing the finally selected next-address as the next-address in the execution of said micro-program;

(b) means for storing a plurality of micro-program values including micro-program addresses, in a last-in/first-out manner, being a last-in/first-out stack register array;

(c) loop iteration means for storing a loop iteration value and for modifying said loop iteration value;

(d) an address storage register, responsive to said final selection means for storing the next-address selected in the execution of said micro-program; and (e) loop control means for transferring said loop iteration value and the next-address stored by said address storage register from said loop iteration means and said address storage register, respectively, to said last-in/first-out stack register array and from said last-in/first-out stack register array to said loop iteration means and to said final selection means, respectively.

13. The sequencer of claim 3 or 12 further comprising sequencer control means for signaling said loop control means to enable said loop control means to transfer said loop iteration value and said loop instruction address to and from said last-in/first-out stack register array, said sequencer control means being responsive to said loop iteration means for determining whether said loop iteration value, as modified by said loop iteration means, matches a predetermined loop iteration value.

* * * * *